United States Patent
Telefus et al.

(10) Patent No.: US 8,520,410 B2
(45) Date of Patent: Aug. 27, 2013

(54) VIRTUAL PARAMETRIC HIGH SIDE MOSFET DRIVER

(75) Inventors: Mark Telefus, Orinda, CA (US); Bahman Sharifipour, Westford, MA (US)

(73) Assignee: Flextronics AP, LLC, Broomfield, CO (US)

( * ) Notice: Subject to any disclaimer, the term of this patent is extended or adjusted under 35 U.S.C. 154(b) by 324 days.

(21) Appl. No.: 12/942,265

(22) Filed: Nov. 9, 2010

(65) Prior Publication Data

US 2012/0113686 A1    May 10, 2012

(51) Int. Cl.
*H02M 3/335* (2006.01)

(52) U.S. Cl.
USPC ........................................... 363/21.02

(58) Field of Classification Search
USPC .............. 363/16, 20, 21.02, 21.03, 55, 56.01, 363/95, 97, 131
See application file for complete search history.

(56) References Cited

U.S. PATENT DOCUMENTS

| | | |
|---|---|---|
| 4,184,197 A | 1/1980 | Cuk et al. |
| 4,273,406 A | 6/1981 | Okagami |
| 4,370,703 A | 1/1983 | Risberg |
| 4,563,731 A | 1/1986 | Sato et al. |
| 4,645,278 A | 2/1987 | Yevak et al. |
| 4,712,160 A | 12/1987 | Sato et al. |
| 4,788,626 A | 11/1988 | Neidig et al. |
| 4,806,110 A | 2/1989 | Lindeman |
| 4,823,249 A | 4/1989 | Garcia, II |
| 4,841,220 A | 6/1989 | Tabisz et al. |
| 4,857,822 A | 8/1989 | Tabisz et al. |
| 4,866,367 A | 9/1989 | Ridley et al. |
| 4,890,217 A | 12/1989 | Conway |
| 4,893,227 A | 1/1990 | Gallios et al. |
| 4,899,256 A | 2/1990 | Sway-Tin |
| 4,901,069 A | 2/1990 | Veneruso |
| 5,065,302 A | 11/1991 | Kanazawa |
| 5,090,919 A | 2/1992 | Tsuji |
| 5,101,322 A | 3/1992 | Ghaem et al. |
| 5,132,890 A | 7/1992 | Blandino |
| 5,235,491 A | 8/1993 | Weiss |
| 5,325,283 A | 6/1994 | Farrington |

(Continued)

FOREIGN PATENT DOCUMENTS

| | | | |
|---|---|---|---|
| JP | 4217869 A | 8/1992 | |
| JP | 10243640 A | 9/1998 | |

(Continued)

OTHER PUBLICATIONS

International Search Report, PCT/US2011/49438, International filed Aug. 26, 2011, 10 pages.

(Continued)

*Primary Examiner* — Matthew Nguyen
(74) *Attorney, Agent, or Firm* — Haverstock & Owens, LLP

(57) ABSTRACT

A power supply apparatus and method of regulating is provided. A converter circuit includes a primary switching element and an auxiliary switching element. The auxiliary switching element is for transferring a reflected voltage signal. A transformer includes a primary and a secondary, the primary is coupled with the converter circuit. The converter circuit comprises a primary and an auxiliary switch for selectively determining a resonant frequency. The auxiliary switch is enabled by a driver having an independent power source so as to allow as strong a driver as necessary to drive a large auxiliary switch.

33 Claims, 6 Drawing Sheets

(56) References Cited

U.S. PATENT DOCUMENTS

| | | | |
|---|---|---|---|
| 5,365,403 A | 11/1994 | Vinciarelli et al. | |
| 5,373,432 A | 12/1994 | Vollin | |
| 5,442,540 A | 8/1995 | Hua | |
| 5,673,185 A | 9/1997 | Albach et al. | |
| 5,712,772 A | 1/1998 | Telefus et al. | |
| 5,790,395 A | 8/1998 | Hagen | |
| 5,811,895 A | 9/1998 | Suzuki et al. | |
| 5,838,554 A | 11/1998 | Lanni | |
| 5,859,771 A | 1/1999 | Kniegl | |
| 5,905,369 A | 5/1999 | Ishii et al. | |
| 5,923,543 A | 7/1999 | Choi | |
| 5,949,672 A | 9/1999 | Bernet | |
| 6,091,611 A | 7/2000 | Lanni | |
| 6,188,302 B1 | 2/2001 | Conway | |
| 6,191,957 B1 | 2/2001 | Peterson | |
| 6,272,015 B1 | 8/2001 | Mangtani | |
| 6,275,397 B1 | 8/2001 | McClain | |
| 6,323,627 B1 | 11/2001 | Schmiederer et al. | |
| 6,385,059 B1 | 5/2002 | Telefus et al. | |
| 6,388,897 B1 | 5/2002 | Ying et al. | |
| 6,390,854 B2 | 5/2002 | Yamamoto et al. | |
| 6,396,716 B1 | 5/2002 | Liu et al. | |
| 6,452,816 B2 | 9/2002 | Kuranuki | |
| 6,459,175 B1 | 10/2002 | Potega | |
| 6,487,098 B2 | 11/2002 | Malik et al. | |
| 6,549,409 B1 | 4/2003 | Saxelby et al. | |
| 6,578,253 B1 | 6/2003 | Herbert | |
| 6,618,274 B2 | 9/2003 | Boylan et al. | |
| 6,650,552 B2 | 11/2003 | Takagi et al. | |
| 6,654,261 B2 | 11/2003 | Welches et al. | |
| 6,721,192 B1 | 4/2004 | Yang et al. | |
| 6,775,162 B2 | 8/2004 | Mihai et al. | |
| 6,894,461 B1 | 5/2005 | Hack et al. | |
| 6,899,434 B2 | 5/2005 | Morishita | |
| 6,919,715 B2 | 7/2005 | Muratov et al. | |
| 6,989,997 B2 | 1/2006 | Xu | |
| 7,035,126 B1 | 4/2006 | Lanni | |
| 7,038,406 B2 | 5/2006 | Wilson | |
| 7,102,251 B2 | 9/2006 | West | |
| 7,139,180 B1 | 11/2006 | Herbert | |
| 7,202,640 B2 | 4/2007 | Morita | |
| 7,208,833 B2 | 4/2007 | Nobori et al. | |
| 7,212,420 B2 | 5/2007 | Liao | |
| 7,239,532 B1 | 7/2007 | Hsu et al. | |
| 7,274,175 B2 | 9/2007 | Manolescu | |
| 7,315,460 B2* | 1/2008 | Kyono | 363/16 |
| 7,386,286 B2 | 6/2008 | Petrovic et al. | |
| 7,450,388 B2 | 11/2008 | Beihoff et al. | |
| 7,499,301 B2 | 3/2009 | Beihoff et al. | |
| 7,545,256 B2 | 6/2009 | O'Toole et al. | |
| 7,564,706 B1 | 7/2009 | Herbert | |
| 7,596,007 B2 | 9/2009 | Phadke | |
| 7,701,305 B2 | 4/2010 | Lin et al. | |
| 7,924,578 B2* | 4/2011 | Jansen et al. | 363/21.02 |
| 8,059,434 B2 | 11/2011 | Huang | |
| 8,102,678 B2 | 1/2012 | Jungreis | |
| 8,126,181 B2 | 2/2012 | Yamamoto et al. | |
| 8,134,848 B2 | 3/2012 | Whittam et al. | |
| 8,155,368 B2 | 4/2012 | Cheung et al. | |
| 8,194,417 B2 | 6/2012 | Chang | |
| 8,207,717 B2 | 6/2012 | Uruno et al. | |
| 8,243,472 B2 | 8/2012 | Chang et al. | |
| 8,369,111 B2 | 2/2013 | Balakrishnan et al. | |
| 8,400,801 B2 | 3/2013 | Shinoda | |
| 2002/0008963 A1 | 1/2002 | DiBene, II et al. | |
| 2002/0011823 A1 | 1/2002 | Lee | |
| 2002/0036200 A1 | 3/2002 | Ulrich | |
| 2003/0035303 A1 | 2/2003 | Balakrishnan et al. | |
| 2003/0112645 A1 | 6/2003 | Schlecht | |
| 2004/0183510 A1 | 9/2004 | Sutardja et al. | |
| 2004/0252529 A1 | 12/2004 | Huber et al. | |
| 2005/0024016 A1 | 2/2005 | Breen et al. | |
| 2005/0036338 A1 | 2/2005 | Porter et al. | |
| 2005/0117376 A1 | 6/2005 | Wilson | |
| 2005/0138437 A1 | 6/2005 | Allen et al. | |
| 2005/0194942 A1 | 9/2005 | Hack et al. | |
| 2005/0225257 A1 | 10/2005 | Green | |
| 2005/0254268 A1 | 11/2005 | Reinhard et al. | |
| 2006/0002155 A1 | 1/2006 | Shteynberg et al. | |
| 2006/0022637 A1 | 2/2006 | Wang et al. | |
| 2006/0109696 A1 | 5/2006 | Ren et al. | |
| 2006/0152947 A1 | 7/2006 | Baker et al. | |
| 2006/0213890 A1 | 9/2006 | Kooken et al. | |
| 2006/0232220 A1 | 10/2006 | Melis | |
| 2007/0040516 A1 | 2/2007 | Chen | |
| 2007/0051712 A1 | 3/2007 | Kooken et al. | |
| 2007/0120542 A1 | 5/2007 | LeMay | |
| 2007/0121981 A1 | 5/2007 | Koh et al. | |
| 2007/0138971 A1 | 6/2007 | Chen | |
| 2007/0247091 A1 | 10/2007 | Maiocchi | |
| 2007/0247877 A1 | 10/2007 | Kwon et al. | |
| 2007/0263415 A1 | 11/2007 | Jansen et al. | |
| 2008/0018265 A1 | 1/2008 | Lee et al. | |
| 2008/0043496 A1 | 2/2008 | Yang | |
| 2008/0191667 A1 | 8/2008 | Kernahan et al. | |
| 2009/0034299 A1 | 2/2009 | Lev | |
| 2009/0196073 A1 | 8/2009 | Nakohori | |
| 2009/0290384 A1 | 11/2009 | Jungreis | |
| 2009/0290385 A1 | 11/2009 | Jungreis et al. | |
| 2010/0039833 A1 | 2/2010 | Coulson et al. | |
| 2010/0322441 A1 | 12/2010 | Weiss et al. | |
| 2011/0132899 A1 | 6/2011 | Shimomugi et al. | |
| 2011/0261590 A1 | 10/2011 | Liu | |
| 2012/0112657 A1 | 5/2012 | Van Der Deen et al. | |

FOREIGN PATENT DOCUMENTS

| | | |
|---|---|---|
| JP | 2000083374 A | 3/2000 |
| JP | 2000253648 A | 9/2000 |
| JP | 2004208357 A | 7/2004 |

OTHER PUBLICATIONS

EE Times.com- "Teams Claim Midrange Wireless Energy Transfer", by R. Colin Johnson, 4 pages, Nov. 6, 2007.

EE Times.com- "Wireless Beacon Could Recharge Consumer Devices", by R. Colin Johnson, 3 pages, Nov. 6, 2007.

Hang-Seok Choi et al., Novel Zero-Voltage and Zero-Current-Switching (ZVZCS) Full-Bridge PWM Converter Using Coupled Output Inductor, Sep. 2002 IEEE, pp. 641-648.

"New Architectures for Radio-Frequency dc/dc Power Conversion", Juan Rivas et al., Laboratory for Electromagnetic and Electronic Systems, Jan. 2004, Massachusetts Institute of Technology, Room 10-171, Cambridge, MA02139, pp. 4074-4084.

"Randomized Modulation in Power Electronic Converters", Aleksander M. Stankovic, member IEEE, and Hanoch LevAri, vol. 90, No. 5, May 2002, pp. 782-799.

"Analysis and Special Characteristics of a Spread-Spectrum technique for Conducted EMI Suppression", K.K. Tse, et al., Member IEEE, IEEE Transactions on Power Electronics, vol. 15., No. 2, Mar. 2000, pp. 399-410.

International Search Report dated 05 Mar. 2012, International Application no. PCT/US2011/059817, International Filing Date: Nov. 8, 2011, 9 pages.

Notice of Allowance re. U.S. Appl. No. 12/687,761, filed Jan. 14, 2010, Examiner: Tran, Nguyen, art unit: 2838, 7 pages.

* cited by examiner

VIRTUAL PARAMETRIC HIGH SIDE MOSFET DRIVER

FIELD OF THE INVENTION

The present invention relates to the field of power supplies. More particularly, the present invention relates to a primary only controlled quasi resonant converter.

BACKGROUND

There are several power converter topologies that have been developed over the years, which are intended to improve the power density and switching efficiency of power converters. An emerging focus of new converter topologies is to provide a means to reduce or eliminate converter switching losses, while increasing the switching frequencies. Lower loss and higher switching frequency means more efficient converters, which can reduce the size and weight of converter components. Additionally, with the introduction of high speed composite semiconductor switches, such as metal oxide semiconductor field effect transistor (MOSFET) switches operated by pulse width modulation (PWM), recent forward and flyback topologies are now capable of operation at greatly increased switching frequencies, such as, for example, up to 1.0 MHz.

However, an increase in switching frequency can cause a corresponding increase in switching and component stress related losses, as well as increased electromagnetic interference (EMI), noise, and switching commutation problems, due to the rapid switching of the semiconductor switches at high voltage and/or high current levels. Moreover, modern electronic components are expected to perform multiple functions, in a small space, efficiently, and with minimal undesirable side effects. For instance, a conventional voltage converter that provides for relatively high power density and high switching frequencies, should also include uncluttered circuit topologies, provide for isolation of the output or "load" voltage from the input or "source" voltage, and also provide for variable step-up or step-down voltage transformation. In an effort to reduce or eliminate the switching losses and reduce EMI noise the use of "resonant" or "soft" switching techniques has been increasingly employed in the art. The application of resonant switching techniques to conventional power converter topologies offers many advantages for high density, and high frequency, to reduce or eliminate switching stress and reduce EMI. However, the complexity required to provide control to the power switches and the components associated with complex control, create a limited use in commercial applications.

In an effort to reduce or eliminate the switching losses and reduce EMI noise caused by high switching frequencies, "resonant" or "soft" switching techniques are increasingly being employed. Resonant switching techniques generally include an inductor-capacitor (LC) subcircuit in series with a semiconductor switch which, when enabled, creates a resonating subcircuit within the converter. Further, timing the control cycles of the resonant switch to correspond with particular voltage and current conditions across respective converter components during the switching cycle allows for switching under zero voltage and/or zero current conditions. Zero voltage switching (ZVS) and/or zero current switching (ZCS) inherently reduces or eliminates many frequency related switching losses. Several power converter topologies have been developed utilizing resonant switching techniques, such as, for example, U.S. Pat. No. 5,694,304 entitled "High Efficiency Resonant Switching Converters," to Telefus, et al., (Telefus), which is hereby incorporated by reference; U.S. Pat. No. 5,057,986 entitled "Zero Voltage Resonant Transition Switching Power Converter," to Henze, et al., (Henze), which is hereby incorporated by reference; U.S. Pat. No. 5,126,931 entitled "Fixed Frequency Single Ended Forward Converter Switching at Zero Voltage," to Jitaru (Jitaru), which is hereby incorporated by reference; and U.S. Pat. No. 5,177,675 entitled "Zero Voltage, Zero Current, Resonant Converter," to Archer, (Archer), which is hereby incorporated by reference.

In particular, Henze describes single ended DC-DC flyback topologies for operation at very high switching frequencies, such as 1.0 MHz or greater. In Henze, a plurality of pulse width modulated (PWM) switches are utilized to effect zero voltage resonant transition switching. Jitaru describes variations of known forward and/or flyback converter topologies employing zero voltage and/or zero current resonant techniques. Jitaru specifically describes a forward converter topology utilizing resonant switching techniques to operate at constant frequency. Archer describes zero voltage, and zero current, switching techniques in resonant flyback topologies utilizing a resonant transformer assembly inserted in parallel with either the primary or secondary winding of the main transformer.

The application of such resonant switching techniques to conventional power converter topologies offers many advantages for high density, high frequency converters, such as quasi sinusoidal current waveforms, reduced or eliminated switching stresses on the electrical components of the converter, reduced frequency dependent losses, and/or reduced EMI. However, energy losses incurred during control of zero voltage switching and/or zero current switching, and losses incurred during driving, and controlling the resonance means, are still problematic. For instance, some researchers have implemented an active clamp in conjunction with a resonant converter circuit to realize the benefits of high frequency switching, while reducing its many side effects. See, for example, the United States Patent to Telefus, incorporated by reference above.

An improved switching type power converter known as a quasi resonant tank circuit is described in US. Patent Publication No. 2007-0263415 to Jansen et. al. (Jansen), hereby incorporated in its entirety. FIG. 1 shows such a power converter 100 having a quasi resonant tank circuit 101 in simplified form. The circuit of FIG. 1 illustrates a conceptual representation of the invention in a Quasi Resonant Flyback converter. The power converter 100 comprises an output transformer 103 with primary and secondary windings, a primary switch 105, an auxiliary switch 104, a first resonance capacitor 106, a second resonance capacitor 102 and a comparator 109 with driving means for the auxiliary switch 104. The converter further includes secondary rectifier means comprising a diode 107 and a reservoir capacitor 108. In this exemplary embodiment, the primary switch 105 is controlled by a primary control module 111. The circuit in FIG. 1 includes a DC power source 112 to provide power to the primary side of the power converter. The comparator 109 and driver means for auxiliary switch 104 are configured such that when the voltage across the primary winding of the transformer 103 is higher than zero, the auxiliary switch will be enabled, or conducting. The comparator 109 and driver means for auxiliary switch 104 are further configured such that when the voltage across the primary winding of the transformer 103 is equal or lower than zero, the auxiliary switch will be disabled. Consequently a first resonance frequency exists for voltages of less than or equal to zero across the primary winding of transformer 103 as a result of the energy exchange between the primary inductance of transformer 103 and the first resonance capacitor 106.

It is well known that MOSFET switches include inherent capacitances that must be accounted for. To that end, FIG. 2 shows the power converter 100 of FIG. 1 in greater detail. The auxiliary switch is represented by a MOSFET 220 with its parasitic capacitances represented as gate to source Ciss1 242, source to drain Coss1 228 and gate to drain Crss1 240, and an inherent body diode 222 that is formed by the junction of an N Well with a P substrate or vice versa. The primary switch is represented by a MOSFET 224 with its parasitic capacitances represented as Ciss2 246, Coss2 248 and Crss2 244, and its inherent body diode 226. The power converter 200 further comprises a transformer 202, driving circuitry for the auxiliary switch 220 comprising three diodes 230, 232, 234 and a driving capacitor 236, and secondary rectification means comprising of a rectifier diode 210 and a smoothing capacitor 212.

The power converter 200 of FIG. 2 comprises a quasi resonant tank circuit 201. The first resonance capacitor 102 in FIG. 1 comprises the combination of the parasitic capacitor Coss1 228 and Crss1 240 of the auxiliary switch 220. Also, the parasitic capacitance Crss1 240 also appears in series with the second resonance capacitor 238 along with the capacitor Coss2 248 and capacitor Crss2 244 of the primary switch 242. The second resonance capacitor 106, of FIG. 1, is represented in FIG. 2 by the capacitor C2 238.

In most single ended power converters such as the flyback converters of FIGS. 1 and 2, it is desirable to keep a reset voltage limited so that the voltage level (Vds1) across a switching MOSFET such as the primary switch 224, in the case of the power converter remains within the safe operating area. In this situation, the reset voltage (Vres) across the primary winding of the transformer 202 is lower than the voltage across the primary winding of the transformer (Vde) during the on-time of the primary switch 224. To achieve Zero Voltage Switching for the primary switch 224, the energy (Ehigh) in the effective resonance capacitance at the point of maximum reset voltage (Vres) has to be equal or larger than the energy (Elow) in the effective resonance capacitance just prior to the switch on of the primary MOSFET. In general, as the operating frequency of a resonant capacitor approaches its self resonant frequency, the capacitive value will appear to increase causing an effective resonance capacitance that is higher than the physical capacitor's stated value.

A person of ordinary skill in the art will appreciate that the driving capacitor 236 is in parallel with the secondary resonant capacitor 238 when the auxiliary switch 220 is enabled. As a result, the values of the driving capacitor 236 and the secondary resonant capacitor 238 must be proportional; i.e. one should not be changed without changing the other since doing so would change the effective total resonance capacitance for the tank circuit 201. However, a capacitor of a smaller value cannot drive a capacitor of a higher value. As a result, in high power applications, such as power greater than 10 watts at an output, the auxiliary switch 220 must be larger in order to properly handle increased current flow. As the switch 220 increases in size, parasitic capacitances Crss1 and Ciss1 increase proportionally. As a result, the driving capacitor 236 must be of a higher value. A discrete capacitor of a higher value directly translates to increased size and cost, which can be unacceptable in small form factor products. Regardless of the size and cost, increasing all values may simply be untenable due to increased serial equivalent resistance of the capacitors causing unacceptable decreases in efficiency. To that end, what is needed is a power converter circuit having a quasi resonant tank circuit wherein the circuit driving the auxiliary switch is independent of the auxiliary switch itself.

SUMMARY OF THE INVENTION

The instant invention provides a switching type power converter utilizing a quasi resonant tank circuit. A primary switch and an auxiliary switch selectively couple energy storing elements to the tank circuit, thereby changing a resonant frequency. The auxiliary switch is driven by an independent driver having a separate power source, enabling higher power conversion with respect to the prior art listed above while using physically small and cost effective elements, including transistors.

In a first aspect of the invention, a power converter comprises an output transformer, and a resonant tank circuit coupled to the output transformer. In some embodiments, the resonant tank comprises a primary switch for selectively charging a first energy storing element, a second energy storing element in parallel with the first energy storing element, an auxiliary switch for selectively coupling a third energy storing element with the first energy storing element, and a first power source for providing power to the resonant tank circuit. A comparator detect a voltages across at least one of the energy storage elements, and a driver drives the auxiliary switch based on the output state of the comparator. Advantageously, the driver comprises a second power source for providing a power independent of the tank circuit.

In operation, the fact that the driver receives power from a separate power source enables the driver to draw as much current as it needs, and is therefore able to drive an auxiliary switch of any size. The added components of the driver are generally transistors, which are very cost effective and small in form factor, enabling high power output power converters in a small form factor apparatus, able to charge or provide operating power to anything from a cellular telephone to an electric vehicle, depending on the size of the driver. In some embodiments, the second power source is a rectifier coupled to a winding of a power transformer.

The energy storage elements described above are able to be any among a discrete inductor, the inductance of the transformer, discrete capacitors or parasitic capacitors inherent to switches. The switches are able to be MOSFETs, or for higher power applications IGBTs. Preferably, the comparator comprises a capacitor for receiving charge from at least one energy storage element, a first diode for directing current to a pre-driver, a second diode for limiting a reverse current to the at least one energy storage element and a third diode for limiting a reverse current to the pre-driver. In some embodiments, the pre-driver is able to be a MOSFET. The driver is able to be any known or application specific driver to suit a particular application taking into consideration power and efficiency needs, such as a Class A circuit, a Class AB circuit, a Class B circuit, a Class C circuit and a Class D circuit.

In another aspect of the invention, a power converter comprises an output transformer, a first resonance capacitor coupled to the transformer to form a resonant circuit with the primary inductance of the output transformer, a primary switch for selectively charging the first resonance capacitor, and a second resonance capacitor coupled to the output transformer. An auxiliary switch forms a resonant circuit with the primary inductance of said transformer, and a comparator determines an amount of charge on the first resonance capacitor. In order to effectively drive any size auxiliary switch according to the output state of the comparator as determined by the charge on the first resonance capacitor, a driver is provided, wherein the driver comprises an independent power supply. In some embodiments, the comparator comprises a capacitor for receiving charge from the first resonant capacitor and a pre-driver for receiving charge from the capacitor and driving the driver. Diodes may be used to direct current to the pre-driver and away from the resonant capacitor. In some embodiments, the first and second resonant capacitors are able to comprise discrete component capacitors or parasitic capacitors inherent to the switches.

Preferably, the power converter utilizes a switching cycle comprising a first resonant cycle, and a second resonant cycle, wherein energy in the first resonant capacitor is substantially transferred to the second resonance capacitor through the first and second resonant cycles. Generally, the first resonant cycle comprises a higher frequency than the second resonant cycle. In some embodiments, the comparator selectively enables a driver according to the switching cycle, wherein the driver drives the auxiliary switch.

BRIEF DESCRIPTION OF THE DRAWINGS

The novel features of the invention are set forth in the appended claims. However, for purposes of explanation, several embodiments of the invention are set forth in the following figures.

DETAILED DESCRIPTION

In the following description, numerous details and alternatives are set forth for the purpose of explanation. However, one of ordinary skill in the art will realize that the invention can be practiced without the use of these specific details. In other instances, well-known structures and devices are shown in block diagram form in order not to obscure the description of the invention with unnecessary detail.

Figure 1:
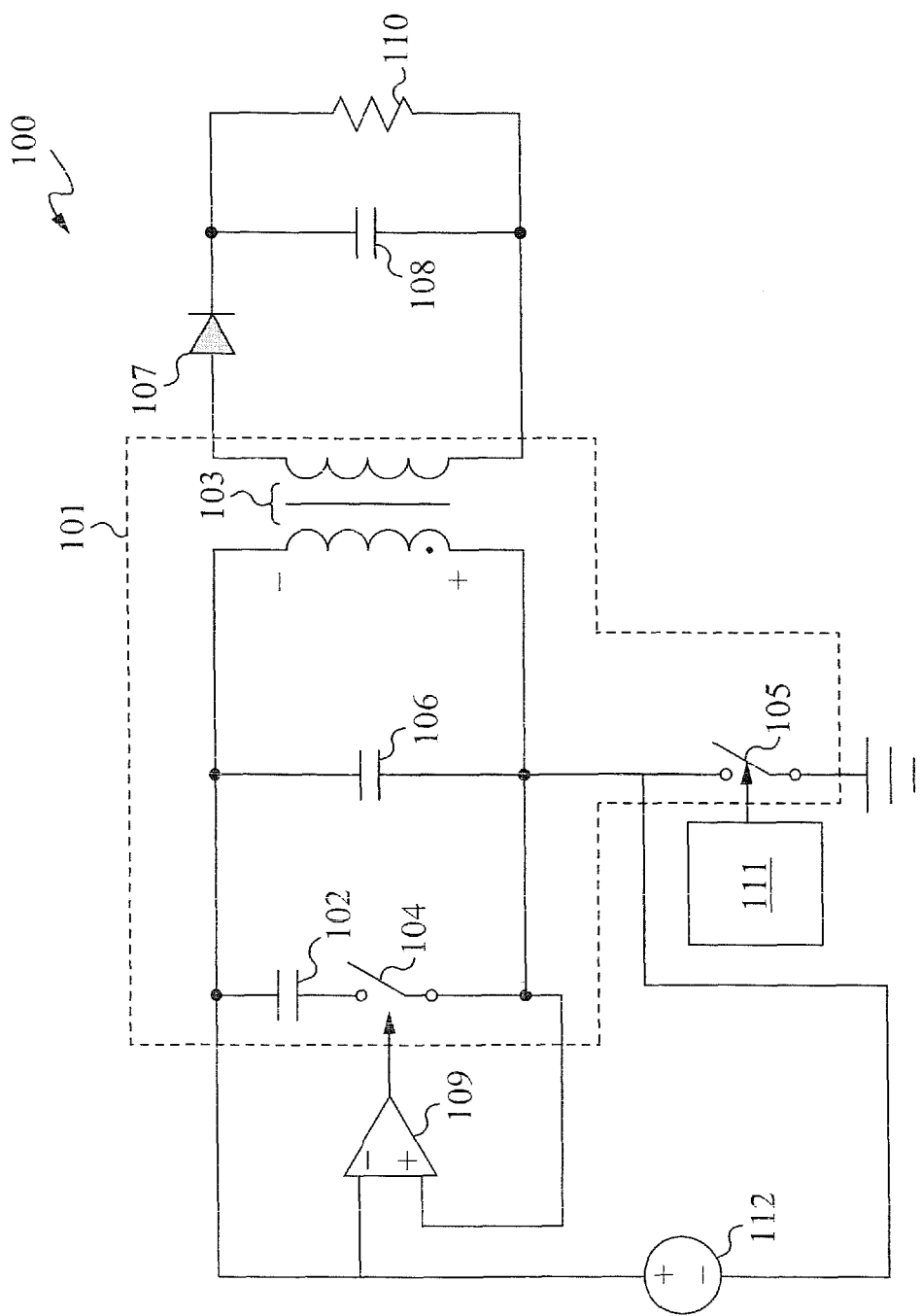
FIG. 1 illustrates a prior art functional block diagram of a power supply apparatus.
Figure 3:
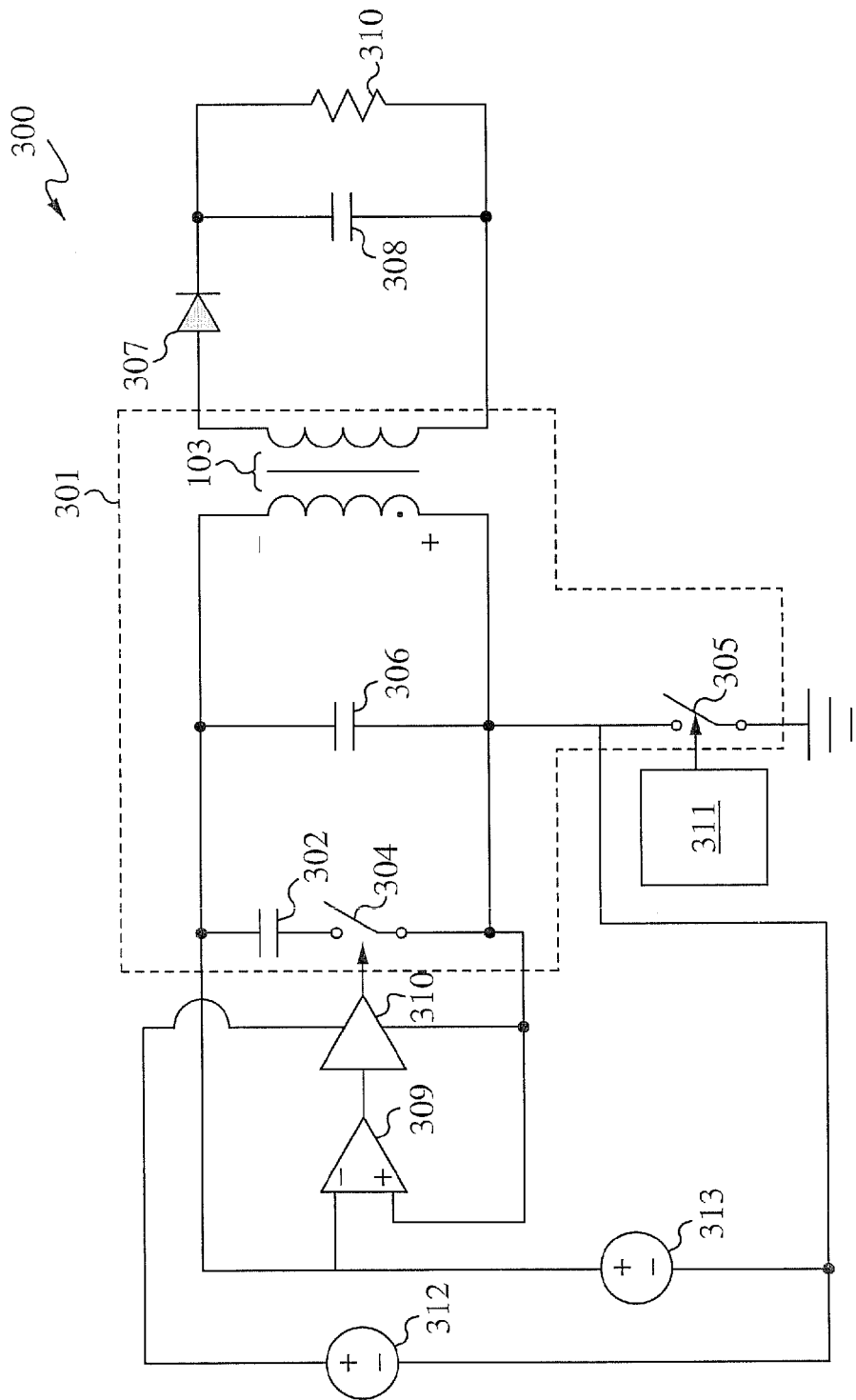
FIG. 3 illustrates a schematic diagram of a power supply apparatus in accordance with an embodiment of the invention.

FIG. 3 shows a simplified power converter 300 having a quasi resonant tank circuit 301 according to an embodiment of the current invention. The circuit of FIG. 1 illustrates a conceptual representation of the invention in a Quasi Resonant Flyback converter having improved driving means. The power converter 300 comprises a transformer 303 with primary and secondary windings, a primary switch 305, an auxiliary switch 304, a first resonance capacitor 306, a second resonance capacitor 302 and a comparator 309. The comparator 309 controls a driver circuit 310 that drives the auxiliary switch 304. In some embodiments, the comparator 309 and the driver 310 are powered by separate DC power sources 312 and 313, respectively. The power source 312 of the driver 310 is sufficiently strong, i.e. able to deliver sufficient current such that the driver 310 drives an auxiliary switch 304 of any size. In this embodiment, the driver 310 is decoupled from the comparator 309 and uses a different power supply. However, the comparator 309 and driver 310 may use the same power supply as the driver 310 may be configured to draw as much power as necessary to drive a large switch. By way of example, each power supply 312, 313 or others may be rectified outputs of windings of a power transformer. The converter 300 further includes an output rectifier comprising a diode 307 and a reservoir capacitor 308. In this exemplary embodiment, the primary switch 305 is controlled by a primary control module 311. By way of example, the control module 311 is an integrated circuit such as a processor having driving means capable of applying an appropriate driving signal shown in FIGS. 5 and 6 below.

The comparator 309 and driver 310 for the auxiliary switch 304 are configured such that when the voltage across the primary winding of the transformer 303 is higher than zero, the auxiliary switch will 304 is the on position. The comparator 309 and driver 310 for auxiliary switch 304 are further configured such that when the voltage across the primary winding of the transformer 303 is equal or lower than zero, the auxiliary switch 304 is disabled. Consequently, a first resonance frequency exists for voltages of less than or equal to zero across the primary winding of transformer 303 as a result of the energy exchange between the primary inductance of transformer 303 and the first resonance capacitor 306.

Figure 2:
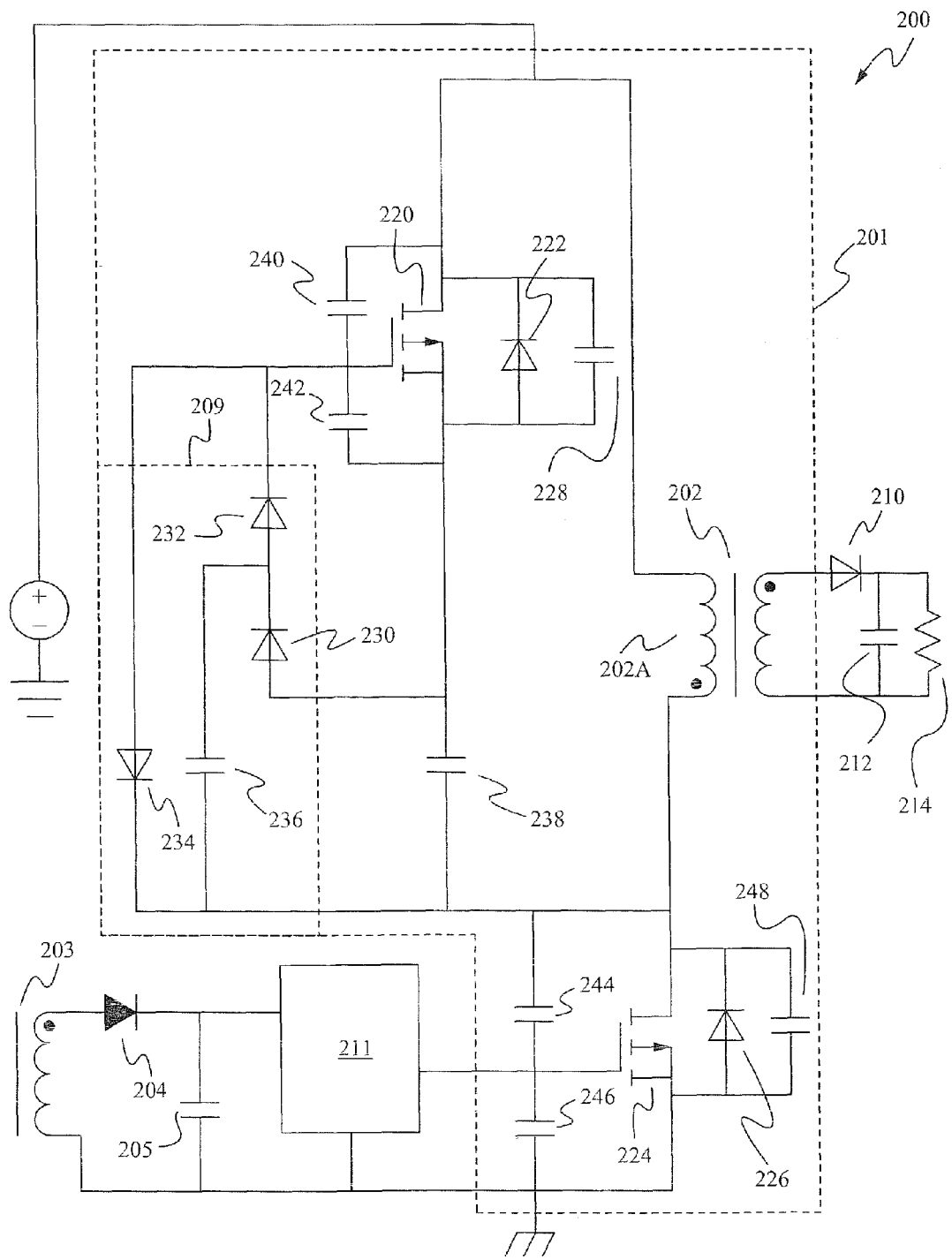
FIG. 2 illustrates a prior art functional block diagram of a power supply apparatus in greater detail.

Advantageously, the driver 310 is able to be as powerful a driving device as necessary because it is independent from the comparator 309. In the prior art of FIG. 1, the comparator 109 is the only driving means available to drive the auxiliary switch 104, and as a result the entire power converter is limited in the amount of power it can deliver due to the fact that the driving capacitor 236 in FIG. 2 must be of a larger value than the parasitic capacitance of the auxiliary switch 220. The present invention solves that problem by parametrically, or independently, driving the auxiliary switch 304 by an independent driver 310. The auxiliary switch is sufficiently large as to carry any required amount of current. The primary switch 305 is driven by an independent driving and control circuit 311. In some embodiments, the driving and control circuit 311 generates an appropriate waveform described in greater detail below to form a resonance within the tank circuit 301.

Figure 4:
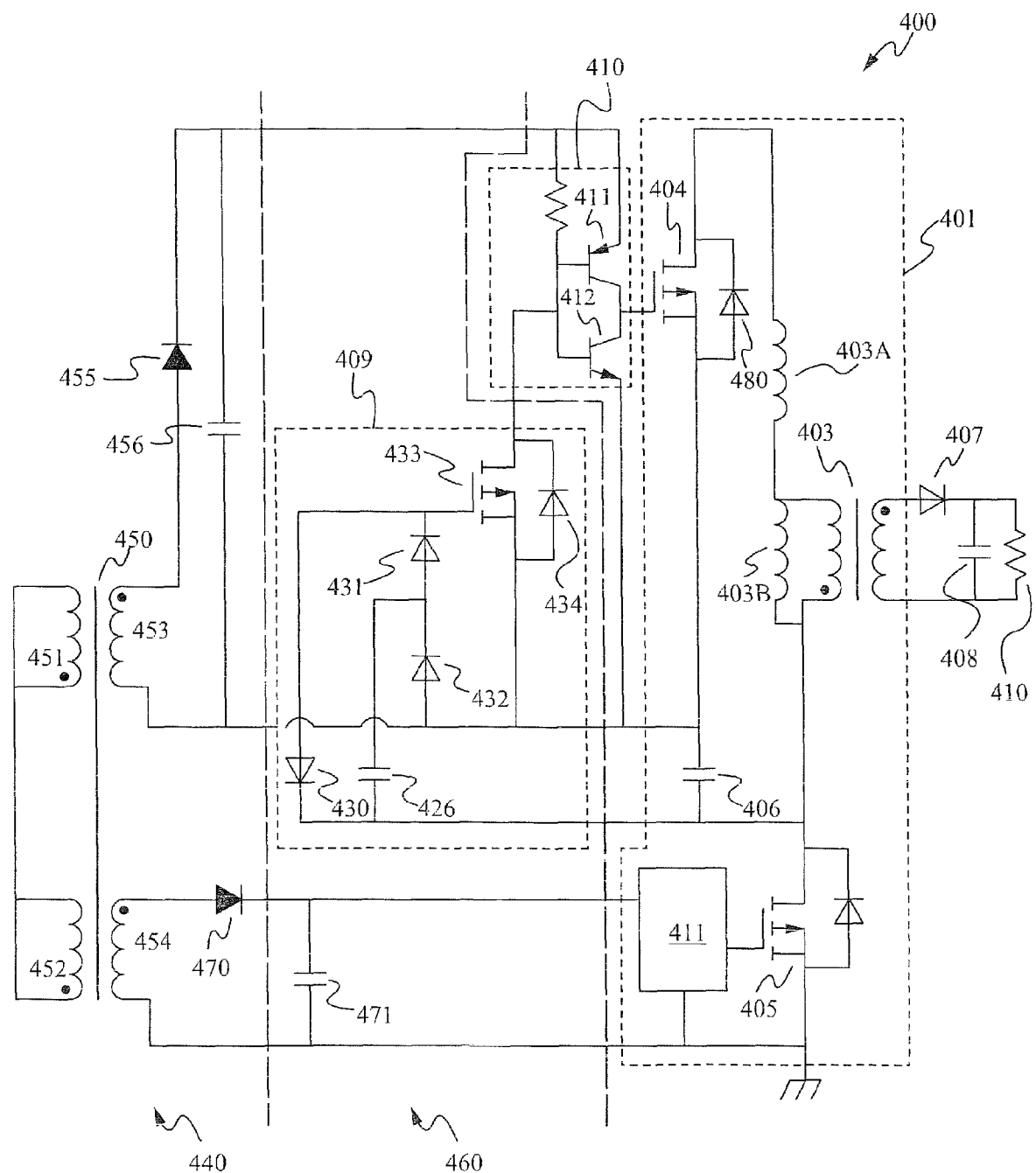
FIG. 4 illustrates a schematic diagram of a power supply apparatus in greater detail in accordance with an embodiment of the invention.

FIG. 4 shows a more detailed view of the power converter 300 of FIG. 3 according to an embodiment of this invention. In some embodiments, the power converter 400 comprises a power stage 440. The power stage 440 serves both to provide operating DC power to the converter 400 and to provide the power that is to be converted. The power stage 400 is coupled to and drives a decision stage 460. The decision stage 460 comprises a comparator 409 and a driving means 410. The comparator 409 comprises a capacitor 426, a first diode D1 431, a second diode D2 432 and a third diode D2 430. The capacitor 426 is charged according to the charge on the first resonant capacitor 406. The first diode D1 431 begins conducting when the charge in the capacitor 426 has reached a sufficient level to forward bias D1 431. Advantageously, the second diode D2 432 is reverse biased thereby limiting current from returning to the resonant capacitor 406. The capacitor 426 begins charging the transistor Q5 433. A bulk diode 434, also known as an inherent diode, is shown in parallel with the transistor Q5 433. The drain of Q5 433 is coupled to a driver means 410. In this exemplary embodiment, the driver means comprises a push pull A-B structure comprising Q3 411 and Q4 412 and is bipolar in construction. The driver 410 shares a DC power source with the comparator 409 that is provided via a first rectification diode 455 in a parallel with a first reservoir capacitor 456 in the power stage 440. Because the driver 410 is electrically coupled to and draws current from own independent winding 453 of the power transformer

450, it can be made as powerful as necessary to drive an auxiliary switch 404 of any size. The diode 455 and reservoir capacitor 456 in the power stage 440 rectify an AC voltage provided by a third winding 453 of the 4 winding transformer 450. However, a person of ordinary skill having the benefit of this disclosure will recognize that the comparator 409 and driver 410 may be powered separately, for example by a separate transformer, or independent windings of the same transformer. Q5 433 is able to function as a pre-driver that is able to drive a separate, more powerful driving means 410. As a result, Q5 433 need not be a large transistor able to handle a large current. Q5 433 may be selected as a simple and small MOSFET. As mentioned above, the driver 410 is represented as a push pull A-B circuit. In alternate embodiments, the driver means 410 is any known or application specific driving means including but not limited to a Class A, Class B, Class C, or Class D (switching) driver. It should be noted that phase shifts caused by the driver of choice should be taken into account when implementing drive signals for forming resonant frequencies within the tank circuit 401. The output from the secondary side of the output transformer 403 is rectified to drive a load 410. In this exemplary embodiment, a diode 407 and a reservoir capacitor 408 serve as a simple rectifier. However, more intricate rectification means, including but not limited to a bridge rectifier and a DC voltage regulator can be used for ripple sensitive applications.

The output of the driver 410 is coupled to the gate of the auxiliary switch 404. Because the auxiliary switch is being parametrically driven by the driver means 410 that is able to provide any necessary drive current, the auxiliary switch 404 is as large as necessary to carry an appropriate current without requiring a change in the value of the capacitor 426. In some embodiments, a protection diode 480 is able to protect from overcurrent conditions. As mentioned above, because the capacitor 426 is no longer driving the auxiliary switch 404, but rather a pre driver switch 433, the resonant capacitor 406 need not be increased in value so that a ratio between the capacitor 426 and the resonant capacitor 406 is maintained, since the value of the capacitor 426 may remain small and still be able to drive a relatively small pre-driver Q5 433. The additional cost of the transistors in the driver means 410 and the pre-driver 433 are generally inconsequential compared to the cost of increased values of capacitors as would be required for higher power applications in the prior art of FIGS. 1 and 2. Perhaps more importantly, the driver 410 and pre-driver 433 cause a small increase in size, whereas capacitors of larger values able to handle greater power cause unacceptable increases in size.

The resonant tank circuit 401 comprises the primary switch 405, the first resonant capacitor 406, the auxiliary switch 404 having parasitic capacitance (not shown) that serves as a second resonant capacitor, and the primary inductance of the output transformer 403. The auxiliary switch 404 is able to selectively couple the resonant capacitor 406 in parallel with the primary winding of the output transformer 403 thereby selectively switching between a first and a second resonant frequency. For voltages of higher than zero across the primary winding of the transformer 403, the auxiliary switch 404 is in the on position and the second resonance capacitor, the gate to drain capacitor of the auxiliary switch 404, is connected in parallel with the first resonance capacitor 406. Consequently, a second resonance frequency, which is lower in value than the first resonance frequency, exists for voltages of higher than zero across the primary winding of transformer 403 as a result of the energy exchange between the primary inductance of transformer 403 and the first and second resonance capacitors. Additional inductance may be included if desired as a discrete inductor 403A in series with the primary winding of the output transformer 403. Inductance may be reduced by adding a discrete inductor 403B in parallel with the primary winding of the output transformer 403. In the exemplary embodiment of FIG. 4, the primary 405 and secondary 404 switches are represented as MOSFETs. However, since this embodiment of the invention is not power limited due to the parametric driver 410 that is independent of the comparator 409, higher power devices, such as Isolated Gate Bipolar Transistors (IGBT) are able to be used in applications requiring that the switches 404 and 405 carry large amounts of current.

Figure 5:
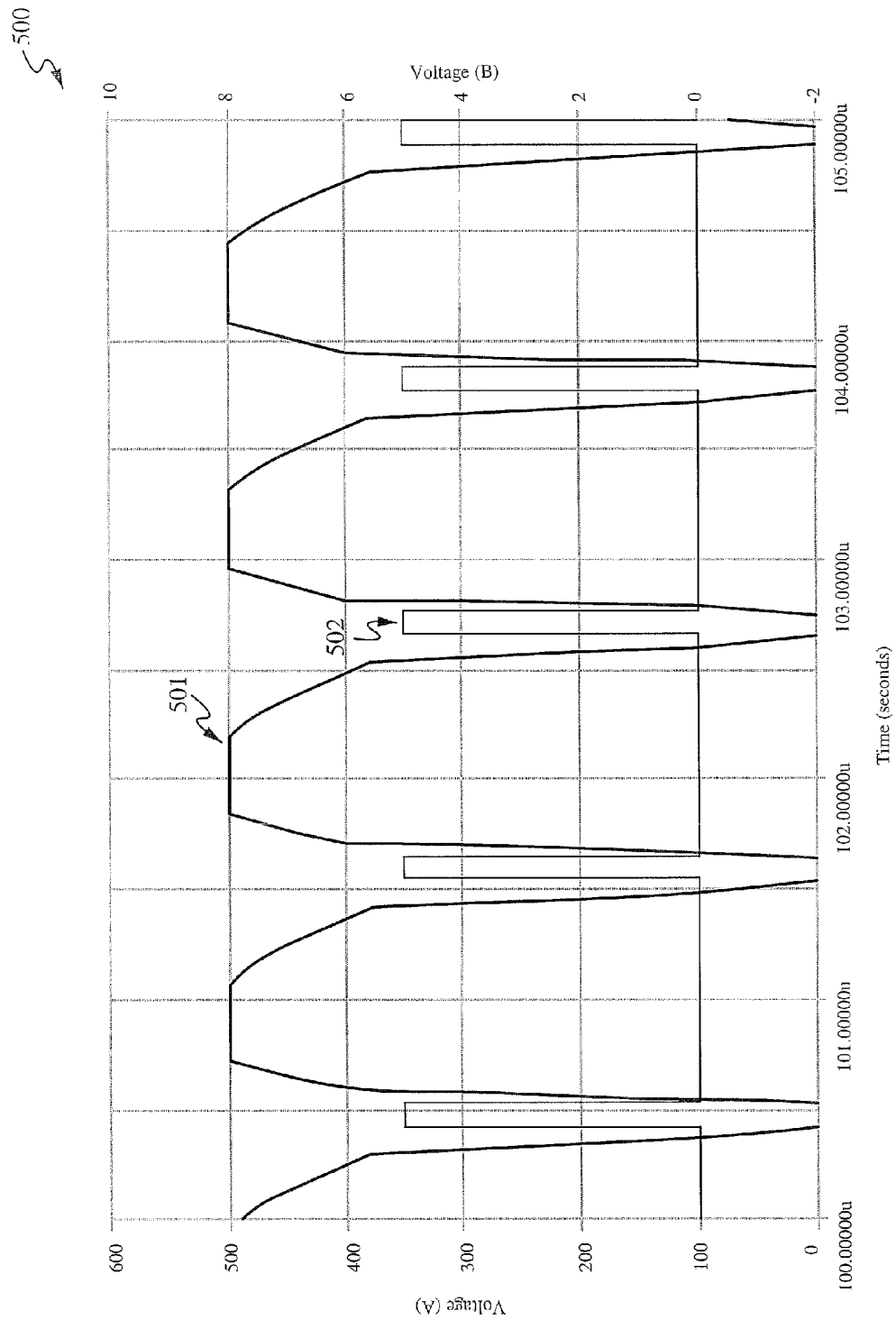
FIG. 5 is an amplitude vs. time graph of a driving signal for a substantial load.

FIG. 5 is a time versus amplitude graph 500 of a drive signal 501 applied the gate of the primary switch 405 of FIG. 4, and the voltage 502 as measured from drain to source of the primary switch 405 for an insubstantial load 410. The following description of a single switching cycle of the power converter from FIG. 3 is based on a steady state continuous waveform under minimum load 410 at the output of the power converter 400 of FIG. 4. The invention also provides similar benefits when operating under other circumstances, such as, but not limited to, operation under a load 410 at the output of the power converter 400 and during start-up of the power converter.

When the power converter from FIG. 4 operates under minimum load conditions, wherein a minimum load is the smallest load that still elicits a resonance in the tank circuit, the duty cycle of the drive signal is very small. One switching cycle of the power converter is now discussed from the moment that the primary switch 405 is switched off until the moment that the primary switch 405 is switched on again. When the primary switch 405 is disabled and the tank circuit is open, the voltage across the first resonance capacitor 406 is substantially equal to the voltage provided by the rectified output of the third winding 453 of the four winding transformer 450. As a result of the resonance between the inductance of the primary winding of the output transformer 403 and the first resonance capacitor 406, the voltage across the primary switch 405 increases and consequently the voltage across the first resonance capacitor 406 and the primary winding of output transformer 403 decreases.

After a quarter cycle of the first resonance frequency, the voltage across the primary switch 405 substantially equals to the rectified power and consequently the voltage across the first resonance capacitor 406 and the primary winding of the output transformer 403 is substantially zero. At this moment most of the energy originally stored in the first resonance capacitor 406 is now stored in the inductance of the primary side of the output transformer 403. Also at this moment the auxiliary switch 404 is switched on by the comparator 409 and the driving means 410 for the auxiliary switch 404. As a result of the second resonance between the inductance of the primary winding of the output transformer 403 and the first and second resonance capacitors in parallel, the voltage across the primary switch 405 further increases and consequently the voltage across the first resonance capacitor 406 and the primary winding of the output transformer 403 also increases.

After a quarter cycle of the second resonance frequency, most of the energy stored in the inductance of the primary side of the output transformer 403 is transferred to the first and second resonance capacitors but in opposite polarity and lower amplitude compared to the original start voltage across the first resonance capacitor 406. Such a condition is referred to as a reset condition. As a result of the resonance between the first and second resonance capacitors and the primary inductance of the primary side of the output transformer 403, the voltage across the primary winding and consequently the voltage across primary switch 405 starts to decline.

After a quarter cycle of the second resonant frequency, most of the energy stored in the first and second resonance capacitors is again stored in the inductance of the primary side of the output transformer 403. At that moment the voltage across the first and second resonance capacitors and the primary side of the output transformer 403 is substantially zero. At that moment the auxiliary switch 404 is disabled by the comparator 309 and the driver means 410. After the auxiliary switch 404 is disabled, the resonance continues based on the original first resonance between the inductance of the primary side of the output transformer 403 and the first resonance capacitor 406.

After a quarter cycle of the first resonance frequency, the voltage across the primary switch 405 further falls until it reaches substantially zero. Then, the primary switch is able to be under substantially Zero Voltage Switching conditions. The auxiliary switch 404 also switches under substantially Zero Voltage Switching conditions as a result of the comparator 409 which detects the zero voltage point across the primary winding of the output transformer 403, which coincides with a substantially zero voltage across the auxiliary switch 404.

Figure 6:
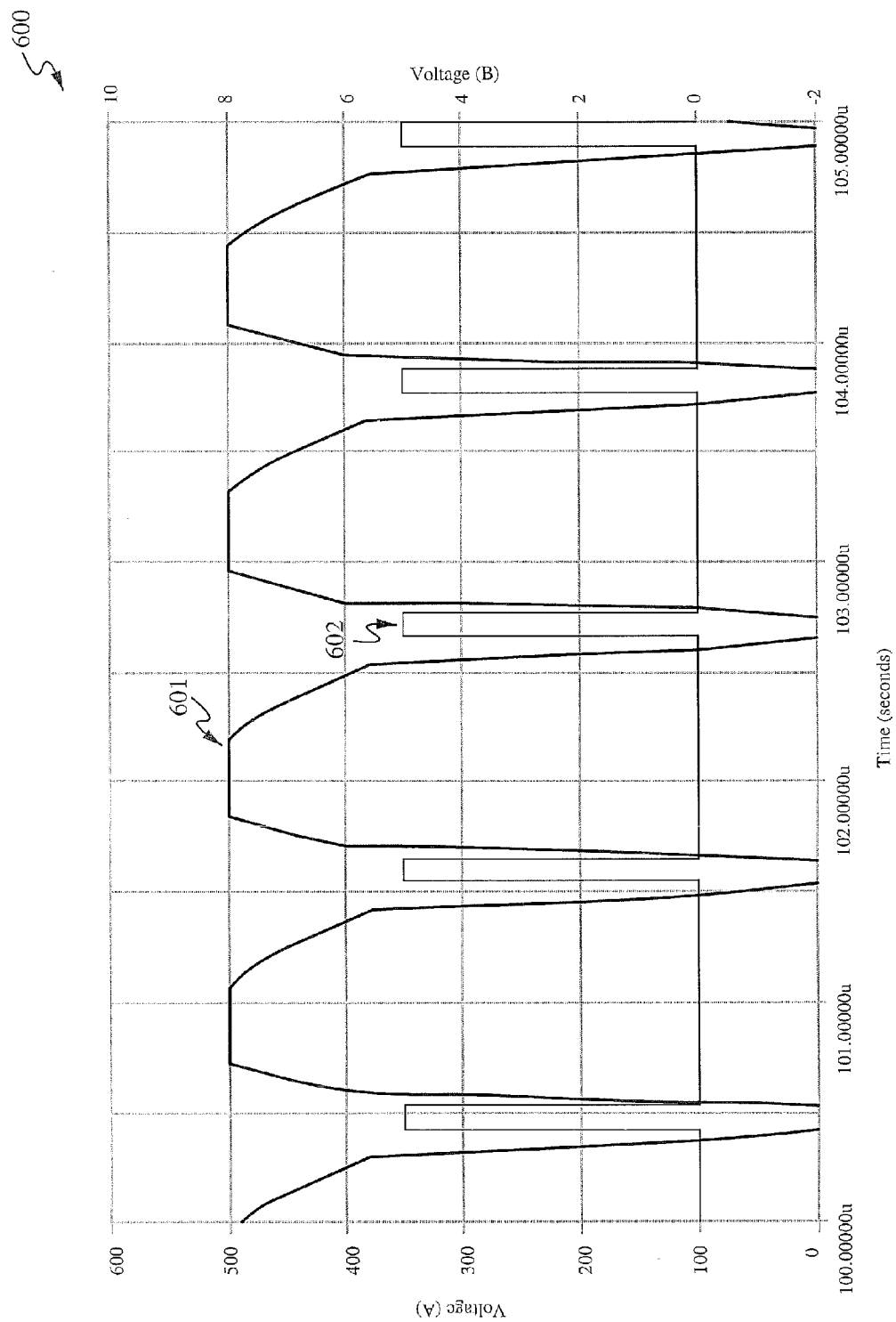
FIG. 6 is an amplitude vs. time graph of a driving signal for an insubstantial load.

FIG. 6 is a time versus amplitude graph 600 of the drive signal 601 applied to the gate for the primary switch 405 of FIG. 4, and the voltage 602 as measured from drain to source of the primary switch 405 for an insubstantial load 410. In this situation, the primary switch 405 is enabled for a longer period than compared to a minimum load condition described above in order to source a greater amount of current and thereby greater charge in the inductance of the primary side of the output transformer 403. After the primary switch 405 is disabled, the rise of the gate voltage across the primary switch 305 progresses in a similar way as described above for the zero load condition. Once the voltage across the primary switch 305 reaches a reset condition as described above, the additional energy in the inductance of the primary side of the output transformer 403 as a result of the longer charge period while the primary switch 405 is enabled discharges through the secondary side of the output transformer 403 and is able to be rectified the secondary rectifier diode 407 and reservoir capacitor 408 and eventually into the load 410.

In operation, a power converter device is able to utilize the benefits of flyback-type without suffering the ill effects of high frequency transients by utilizing a resonant tank circuit as described above. Advantageously, the driver module for one of two switching elements in a tank circuit is independent of a comparator which decides when to enable the switching element to change the resonant frequency of the tank. Because the driver element is independent, and able to derive power from its own power source, for example its own winding and rectifier on a multiple winding transformer, the driver element can be made as powerful as necessary to drive a switching element of any size. In some embodiments, a capacitor and an inductor form the resonance circuit. Alternatively, a capacitor in parallel with the coil of a transformer forms a parallel resonance circuit. In both these types of implementations, the parasitic capacitances advantageously generate a negative current back to the source. Hence, the parasitic capacitances, which are normally problematic for a system, operate as capacitors that store and release energy in conjunction with the resonant tank and the real capacitances. Stated differently, all the components are in a full resonance circuit, including the real or active components, and the parasitic components. Therefore, all or most of the energy generated by the components of the system, including the parasitic components, is transferred either to the load (typically in the low frequency mode), or back to the source (in the high frequency mode).

In particular, the cyclical operation of some embodiments implement a quasi resonant storage tank by the generation of a series of dampening sinusoidal wave forms. Some embodiments further maintain, for the system, an energy equilibrium such that the energy of a high frequency cycle is substantially equivalent to the energy of a low frequency cycle.

While the invention has been described with reference to numerous specific details, one of ordinary skill in the art will recognize that the invention can be embodied in other specific forms without departing from the spirit of the invention. Thus, one of ordinary skill in the art will understand that the invention is not to be limited by the foregoing illustrative details, but rather is to be defined by the appended claims.

What is claimed is:

1. A power converter comprising:
   a. an output transformer;
   b. a resonant tank circuit coupled to the output transformer, comprising:
      i. a first energy storing element;
      ii. a primary switch for selectively charging a first energy storing element;
      iii. a second energy storing element in parallel with the first energy storing element; and
      iv. an auxiliary switch for selectively coupling a third energy storing element with the first energy storing element;
   c. a first power source coupled to the resonant tank circuit for providing power to the resonant tank circuit;
   d. a comparator to detect a voltage across at least one of the energy storage elements;
   e. a driver to drive the auxiliary switch based on the output state of the comparator; and
   f. a second power source coupled to the driver for providing power to the tank circuit, wherein the second power source is independent from the first power source.

2. The power supply apparatus of claim 1 wherein the second power source comprises a rectifier coupled to a winding of a power transformer.

3. The power supply apparatus of claim 1 wherein the auxiliary switch and third energy storage element are integrally formed as one transistor.

4. The power supply apparatus of claim 1 wherein the first energy storing element comprises the primary winding of the output transformer.

5. The power supply apparatus of claim 1 wherein the first energy storing element comprises a discrete inductor.

6. The power supply apparatus of claim 1 wherein the first energy storing element comprises a capacitor.

7. The power supply apparatus of claim 1 wherein the second energy storing element comprises a capacitor.

8. The power supply apparatus of claim 1 wherein the primary switch comprises a MOSFET.

9. The power supply apparatus of claim 1 wherein the primary switch comprises an IGBT.

10. The power supply apparatus of claim 1 wherein the auxiliary switch comprises a MOSFET.

11. The power supply apparatus of claim 1 wherein the auxiliary switch comprises an IGBT.

12. The power supply apparatus of claim 1 wherein the comparator comprises:
   a. a capacitor for receiving charge from at least one energy storage element; and
   b. a pre-driver for selectively enabling the driver.

13. The power supply apparatus of claim 12 wherein the comparator further comprises
   a. a first diode for directing current to the pre-driver;
   b. a second diode for limiting a reverse current to the at least one energy storage element; and
   c. a third diode for limiting a reverse current to the pre-driver.

14. The comparator of claim 12 wherein the pre-driver comprises a MOSFET.

15. The power supply apparatus of claim 1 wherein the driver comprises any among a Class A circuit, a Class AB circuit, a Class B circuit, a Class C circuit and a Class D circuit.

16. A power converter comprising:
   a. an output transformer;
   b. a first resonance capacitor coupled to the transformer to form a resonant circuit with a primary inductance of the output transformer;
   c. a primary switch for selectively charging the first resonance capacitor;
   d. a second resonance capacitor coupled to the output transformer;
   e. an auxiliary switch to form a resonant circuit with the primary inductance of the transformer;
   f. a comparator for determining an amount of charge on the first resonance capacitor; and
   g. a driver for selectively enabling and disabling the auxiliary switch according to an output state of the comparator, wherein the driver receives an independent power supply.

17. The power converter of claim 16 wherein the comparator comprises:
   a. a capacitor for receiving charge from the first resonant capacitor; and
   b. a pre-driver for receiving charge from the capacitor and driving the driver.

18. The comparator of claim 16 further comprising:
   a. a first diode for directing current to the pre driver from the capacitor;
   b. a second diode for limiting a reverse current to the at least one energy storage element; and
   c. a third diode for limiting a reverse current to the pre-driver.

19. The power converter of claim 16 wherein the first and second resonant capacitors comprise parasitic capacitors.

20. The power converter of claim 16 further comprising:
   a. a switching cycle comprising:
      i. a first resonant cycle, and
      ii. a second resonant cycle, wherein energy in the first resonant capacitor is substantially transferred to the second resonance capacitor through the first and second resonant cycles.

21. The power converter of claim 20 wherein the first resonant cycle comprises a higher frequency than the second resonant cycle.

22. The power converter of claim 16 wherein the primary switch comprises a MOSFET.

23. The power converter of claim 16 wherein the primary switch comprises an IGBT.

24. The power converter of claim 16 wherein the auxiliary switch comprises a MOSFET.

25. The power converter of claim 16 wherein the auxiliary switch comprises an IGBT.

26. A power converter comprising:
   a. a transformer;
   b. a primary switch;
   c. a first resonance capacitor coupled to the transformer to form a resonant circuit with a primary inductance of the transformer;
   d. a second resonance capacitor coupled to the transformer through an auxiliary switch to form a resonant circuit with the primary inductance of said transformer;
   e. a driver that drives the auxiliary switch; and
   f. a comparator, wherein the comparator selectively enables the driver according to a switching cycle.

27. The power converter of claim 26 wherein the switching cycle comprises:
   a. a first resonant cycle, and
   b. a second resonant cycle, wherein energy in the first resonant capacitor is substantially transferred to the second resonance capacitor through the first and second resonant cycles.

28. The power converter of claim 26 wherein the comparator comprises:
   a. a capacitor for receiving charge from the first resonant capacitor; and
   b. a pre-driver for receiving charge from the capacitor and driving the driver.

29. The comparator of claim 28 further comprising:
   a. a first diode for directing current to the pre driver from the capacitor;
   b. a second diode for limiting a reverse current to the at least one energy storage element; and
   c. a third diode for limiting a reverse current to the pre-driver.

30. The power converter of claim 26 wherein the primary switch comprises a MOSFET.

31. The power converter of claim 26 wherein the primary switch comprises an IGBT.

32. The power converter of claim 26 wherein the auxiliary switch comprises a MOSFET.

33. The power converter of claim 26 wherein the auxiliary switch comprises an IGBT.

* * * * *